(12) United States Patent
Sugiyama et al.

(10) Patent No.: US 8,707,928 B2
(45) Date of Patent: Apr. 29, 2014

(54) LUBRICATION APPARATUS FOR FOUR-STROKE ENGINE

(75) Inventors: Masaki Sugiyama, Numazu (JP); Toshihiro Tomita, Numazu (JP); Masaki Kurimoto, Numazu (JP); Hiroshi Kubota, Numazu (JP); Tetsuya Hasegawa, Numazu (JP)

(73) Assignee: Makita Corporation, Aichi (JP)

( * ) Notice: Subject to any disclaimer, the term of this patent is extended or adjusted under 35 U.S.C. 154(b) by 192 days.

(21) Appl. No.: 13/502,799

(22) PCT Filed: Jun. 23, 2010

(86) PCT No.: PCT/JP2010/060673
§ 371 (c)(1),
(2), (4) Date: Apr. 19, 2012

(87) PCT Pub. No.: WO2011/048848
PCT Pub. Date: Apr. 28, 2011

(65) Prior Publication Data
US 2012/0199097 A1    Aug. 9, 2012

(30) Foreign Application Priority Data

Oct. 21, 2009  (JP) .................................. 2009-241993

(51) Int. Cl.
*F01M 11/02* (2006.01)
*F01M 3/04* (2006.01)
*F16N 7/32* (2006.01)

(52) U.S. Cl.
CPC ................. *F01M 11/02* (2013.01); *F01M 3/04* (2013.01); *F16N 7/32* (2013.01)
USPC .................... 123/196 R; 123/196 M; 184/6.9; 184/6.26

(58) Field of Classification Search
CPC ........... F01M 11/02; F01M 1/02; F01M 1/16; F01M 3/04; F01M 9/10; F01M 3/00; F01M 1/06; F01M 9/107; F01M 9/103; F01M 1/12; F16C 3/14; F16C 33/6662; F16N 7/32; F16N 7/34

USPC ...... 123/196 R, 196 CP, 196 M; 184/6.5, 6.9, 184/6.13, 6.26
See application file for complete search history.

(56) References Cited

U.S. PATENT DOCUMENTS 5,975,042 A    11/1999   Aizawa et al.
6,508,224 B2    1/2003   Ito et al.
(Continued)

FOREIGN PATENT DOCUMENTS

JP    11-81953    3/1999
JP    2002-147213    5/2002
(Continued)

OTHER PUBLICATIONS

Search report from E.P.O., mail date is Mar. 26, 2013.

*Primary Examiner* — Noah Kamen
(74) *Attorney, Agent, or Firm* — Greenblum & Bernstein P.L.C.

(57) ABSTRACT

A lubrication apparatus for a four-stroke engine that prevents lubrication failure from occurring around the crankshaft and reliably prevents oil from remaining in a valve operating chamber includes: an intake part positioned below the level of an oil A in an oil reservoir even if the oil reservoir is tilted and the level of the oil A changes; an oil feeding passageway that sucks up the oil A from the intake part and supplies the oil A to the crank chamber; and an direct passageway that allows communication between a valve operating chamber and a crank chamber when a negative pressure is created in the crank chamber. Open end parts of the oil feeding passageway and the direct passageway which are open in the crank chamber are provided to open as the piston moves from a position near the top dead center to the top dead center.

16 Claims, 7 Drawing Sheets

(56) References Cited

U.S. PATENT DOCUMENTS

| | | |
|---|---|---|
| 6,672,273 B2 | 1/2004 | Ito et al. |
| 2001/0029910 A1 | 10/2001 | Ito et al. |
| 2003/0079704 A1 | 5/2003 | Ito et al. |
| 2003/0079711 A1 | 5/2003 | Ito et al. |
| 2009/0013959 A1 | 1/2009 | Lin |

FOREIGN PATENT DOCUMENTS

| | | |
|---|---|---|
| JP | 2002-276321 | 9/2002 |
| JP | 2007-263069 | 10/2007 |

LUBRICATION APPARATUS FOR FOUR-STROKE ENGINE

TECHNICAL FIELD

The present invention relates to a lubrication apparatus for a four-stroke engine, and more specifically, to a lubrication apparatus for a four-stroke engine configured to circulate oil to lubricate inside the engine even if the engine is used in any position.

BACKGROUND ART

Conventionally, two-stroke engines have been used as drive engines for working machines to mow plans, such as a portable brush cutter or trimmer carried by hand and a backpack working machine carried on the back of the user. However, due to increasing public awareness regarding environmental issues, enhancement of emission control and so forth, there is an increasing demand to substitute four-stroke engines for two-stroke engines, as driving sources.

Such a four-stroke engine tends to be heavy because of having greater number of necessary parts than of a two-stroke engine. However, in a case of a portable working machine, the user works, naturally carrying the portable working machine. Therefore, there is a demand for a light-weight four-stroke engine.

Here, a lubrication apparatus for a four-stroke engine has been proposed, which circulates oil using pressure fluctuation in a crank chamber without providing a separate pump for lubrication (see Patent Literature 1). This lubrication apparatus has a first oil passageway configured to penetrate a crankshaft to allow communication between an oil tank and a crank chamber, and lubricates around the crankshaft by supplying oil mist produced in the oil tank to the crank chamber via the first oil passageway, using that a negative pressure is created in the crank chamber. In addition, using that a positive pressure is created in the crank chamber, oil mist produced and scattering in the oil tank is supplied to lubricate a power transmission mechanism (including an intake valve and an exhaust valve) in a first valve operating chamber and a cam mechanism in a second valve operating chamber, which are arranged above the oil tank when the engine stands upright.

This lubrication apparatus is configured to suck the oil accumulated in the valve operating chamber via a siphon and return the oil to the crank chamber, using that a negative pressure is created in the crank chamber as a piston moves due to the rotation of the crankshaft.

CITATION LIST

Patent Literature

PTL1: Japanese Patent Application Laid-Open No. 2002-147213 ([0041] to [0051], FIG. 5 and FIG. 10).

SUMMARY OF INVENTION

Technical Problem

In general, it is required to make the concentration of oil mist higher for the periphery of a crankshaft than for valve operating devices such as a power transmission mechanism and a cam mechanism provided in a valve operating chamber.

This conventional lubrication apparatus supplies oil mist produced in the oil tank into the crank chamber and the valve operating chamber. Therefore, the concentration of the oil mist supplied to the valve operating devices is substantially the same as the concentration of the oil mist supplied to the crank chamber. This causes a problem that it is not possible to lubricate around the crankshaft satisfactorily if oil mist is not sufficiently produced or the produced oil mist is not sufficiently supplied. In addition, there is another problem that if oil mist is oversupplied into the valve operating chamber, the amount of oil remaining in the valve operating chamber is too much, and therefore much oil is discharged while blowby gas is discharged to a combustion chamber, so that oil can be consumed fast.

The present invention was achieved in view of the above-described problems, and it is therefore an object of the present invention to provide a lubrication apparatus for a four-stroke engine configured to be able to prevent lubrication failure from occurring around a crankshaft and reliably prevent oil from remaining in a valve operating chamber.

Solution to Problem

In order to solve this problem, A lubrication apparatus for a four-stroke engine configured to circulate oil accumulated in an oil reservoir provided separately from a crank chamber while lubricating each part of a valve operating mechanism for intake and exhaust, by supplying the oil to the crank chamber and a valve operating chamber accommodating the valve operating mechanism, using pressure fluctuation in the crank chamber, the pressure fluctuation being caused by reciprocating motion of a piston, and discharge blowby gas contained in a circulation route through which the oil circulates, from the valve operating chamber to a combustion chamber. The lubrication apparatus includes: an intake part configured to be positioned below a level of the oil even when an oil reservoir is tilted so that the level of the oil changes, the oil being accumulated in the oil reservoir within a prescribed amount; an oil feeding passageway configured to allow communication between the oil reservoir and the crank chamber when a negative pressure is created in the crank chamber to suck up the oil in the oil reservoir from the intake part and supply the oil to the crank chamber; an open end part of the oil feeding passageway configured to be open in the crank chamber (5a), the open end part (54a) opening while the piston (13) moves from a position near a top dead center to the top dead center, and closing while the piston (13) moves from the position near the top dead center to a bottom dead center; a communicating passageway (59) configured to allow communication between the crank chamber (5a) and the oil reservoir (7) when a positive pressure is created in the crank chamber (5a) and supply oil mist produced in the crank chamber (5a) to the oil reservoir (7); a supply passageway (51) configured to supply the oil mist from the oil reservoir (7) to the valve operating chamber (30); a direct passageway (47) configured to allow communication between the valve operating chamber (30) and the crank chamber (5a) when a negative pressure is created in the crank chamber (5a); an open end part (47a) of the direct passageway (47) configured to be open in the crank chamber (5a), the open end part (47a) opening when the piston (13) moves from the position near the top dead center to the top dead center, and closing when the piston (13) moves from the position near the top dead center to the bottom dead center; and a flow rate control passageway (67) configured to allow communication between the oil feeding passageway (54) and the oil supply passageway (51). The oil feeding passageway (54) sucks air in the supply passageway (51) via the flow rate control passageway (67), so that a flow rate of the oil which flows through the oil feeding passageway (54) and is supplied to the crank chamber (5a), is controlled.

The intake part is configured to be positioned below the level of oil even if the oil reservoir is tilted and the level of the oil changes while the oil is accumulated in the oil reservoir within a prescribed amount. To be more specific, the intake port includes a tubular body made of an elastic material such as rubber and a weight with an intake port mounted on the tip of the tubular body. This weight is mounted to move downward in a vertical direction by gravity. Therefore, the intake part is positioned below the level of the oil in the oil reservoir even if the engine is tilted. As a result, it is possible to sufficiently supply the oil sucked from the intake part via the oil feeding passageway into the crank chamber.

The open end part of the oil feeding passageway which is open in the crank chamber is configured not to always open in the crank chamber independent of the reciprocating movement of the piston. Instead, the open end part configured to open when the piston moves from a position near the top dead center to the top dead center, and close when the piston moves from a position near the top dead center to the bottom dead center side. To be more specific, the open end part is provided on the side wall of the crank chamber in which the piston reciprocates, and configured to close by being covered with the piston as the piston moves, and open when the piston is away from the open end part. Otherwise, another configuration, the so-called rotary valve system, is possible where part of the oil feeding passageway is formed in the crankshaft and an open end part of the oil feeding passageway is open in the crankshaft; the open end part opens and closes according to the rotational position of the crankshaft in synchronization with the movement position of the piston; and the oil in the oil reservoir is supplied to the crank chamber via the oil feeding passageway and the open end part in the crankshaft, using a negative pressure in the crank chamber.

Here, it is necessary to increase a negative pressure in the crank chamber to a certain high level in order to suck liquid oil. Therefore, the open end part of the oil feeding passageway which is open in the crank chamber opens as the piston moves from a position near the top dead center to the top dead center, and, at the time the piston arrives at the top dead center, is fully open. In addition, the open end part of the oil feeding passageway is closed when the piston moves from a position near the top dead center to the bottom dead center side. In this way, with the present invention, the oil reservoir and the crank chamber communicate with one another at the time the level of negative pressure in the crank chamber becomes highest. Therefore, it is possible to supply liquid oil more efficiently from the oil reservoir to the crank chamber.

The communicating passageway serves to supply oil mist produced in the crank chamber to the oil reservoir and allows communication between the crank chamber and the oil reservoir when a positive pressure is created in the crank chamber. Therefore, it is not likely to make an excessive difference in pressure between the crank chamber and the oil reservoir, and consequently it is possible to moderately supply oil mist from the crank chamber to the oil reservoir.

The direct passageway serves to return air required to produce oil mist and the oil remaining in the valve operating chamber to the crank chamber. Like the open end part of the oil feeding passageway, the open end part of the direct passageway which is open in the crank chamber is not always open in the crank chamber independent of reciprocating movement of the piston. Instead, the open end part of the direct passageway opens when the piston moves from a position near the top dead center to the top dead center, and closes when the piston moves from a position near the top dead center to the bottom dead center side. To be more specific, the open end part is provided on the side wall of the crank chamber in which the piston reciprocates. The open end part is closed when being covered with the piston moving, and opens when the piston is away from the open end part. Otherwise, another configuration, the so-called rotary valve system, is possible where part of the direct passageway is formed in the crankshaft and an open end part of the direct passageway is open in the crankshaft; the open end part opens and closes according to the rotational position of the crankshaft in synchronization with the movement position of the piston; and the oil in the oil reservoir is returned to the crank chamber via the direct passageway and the open end part in the crankshaft, using a negative pressure in the crank chamber.

At the time the piston arrives at the top dead center, the open end part has already been open fully. Therefore, even if a large amount of oil mist is liquefied and remains in the valve operating chamber, it is possible to supply the liquid oil to the crank chamber at one time because the level of negative pressure is high in the crank chamber, and consequently prevent oil from remaining in the valve operating chamber. As described above, with the present invention, the valve operating chamber and the crank chamber communicate with one another at the time the level of negative pressure in the crank chamber becomes highest. Therefore, it is possible to supply the oil remaining in the valve operating chamber more efficiently to the crank chamber.

Here, if the open end part of the direct passageway starts opening at the time the degree of negative pressure is still low during pressure fluctuation in the crank chamber, an amount of air sucked into the crank chamber is too much, and consequently a negative pressure at a level high enough to suck oil may not be created in the crank chamber. With the present invention, a position at which the open end parts of the oil feeding passageway and the direct passageway are designed to be controlled. Therefore, it is possible to create a negative pressure in the crank chamber at a high level suitable for sucking oil well. Here, with the present invention, while the piston moves from the top dead center to a position near the top dead center, the open end parts of the oil feeding passageway and the direct passageway remain open, and consequently a positive pressure is created in the crank chamber. This causes concern about that oil and oil mist could flow backward from the crank chamber to the oil reservoir and the valve operating chamber. In this case, the one-way valves are provided in the oil feeding passageway and the direct passageway, respectively, to restrict oil and oil mist from flowing from the crank chamber to the oil reservoir and the valve operating chamber. By this means, it is possible to prevent counter flow.

The flow rate control passageway serves to control the flow rate of oil supplied to the crank chamber via the oil feeding passageway. The flow rate control passageway sucks the air in the supply passageway, and therefore it is possible to control the flow rate of the oil supplied to the crank chamber via the oil feeding passageway. If the more the flow rate control passageway sucks air, the more the flow rate of oil supplied via the supply passageway can be decreased. In this way, the flow rate control passageway prevents oil from being oversupplied to the crank chamber. Then, the flow rate control passageway sucks oil mist and remaining oil as well as the air in the supply passageway at the same time, and therefore it is possible to control to prevent oil mist from being oversupplied to the valve operating chamber.

In addition, with a configuration of the present invention, the flow rate control passageway includes a flow restrictor configured to be able to control the flow rate of air supplied to the oil feeding passageway. By adjusting the flow restrictor to control the amount of air sucked from the supply passageway, it is possible to control the flow rate of oil supplied to the crank chamber via the oil feeding passageway.

In addition, with a configuration of the present invention, the open end part of the oil feeding passageway which is open in the crank chamber side is provided to open before the open end part of the direct passageway in the crank chamber side opens.

The open end part of the oil feeding passageway in the crank chamber side opens before the open end part of the direct passageway in the crank chamber side opens. Therefore, the open end part of the direct passageway is closed at the time the open end part of the oil feeding passageway opens. Therefore, it is possible to supply a sufficient amount of oil first to the crank chamber via the oil feeding passageway, and then, because the open end part of the direct passageway opens, it is possible to supply a sufficient amount of air. Here, in a state in which respective open end parts of the direct passageway and the oil feeding passageway open at the same time, a larger amount of air is sucked into the crank chamber than of oil because the viscosity of air is lower than that of oil.

Moreover, with a configuration of the present invention, the open end part of the oil feeding passageway and the open end part of the direct passageway are provided on the side wall of the crank chamber in which the piston reciprocates. These open end parts are configured to open when the piston moves from a position near the top dead center to the top dead center and close when the piston moves from a position near the top dead center to the bottom dead center. The reed valve is provided in the communicating passageway.

The respective open end parts of the oil feeding passageway and the direct passageway which are open in the crank chamber side are provided on the side wall of the crank chamber. Therefore, it is possible to open and close these open end parts as the piston moves. Therefore, as compared to the rotary valve system that has a communicating passageway provided in the crankshaft to allow communication between the oil reservoir and the crank shaft and supplies oil into the crank chamber via the communicating passageway, using a negative pressure in the crank chamber, the present invention can reliably open the open end part at a predetermined accurate timing, in relation to the movement of the piston.

The communicating passageway is provided with the reed valve. Therefore, it is possible to allow communication between the crank chamber and the oil reservoir at the same time a positive pressure is created in the crank chamber with a simple structure. Also it is possible to shut down communication between the crank chamber and the oil reservoir at the same time a negative pressure is created in the crank chamber.

The lubrication apparatus for a four-stroke engine according to the present invention includes: the intake part positioned below the level of oil even if the oil reservoir is tilted and the level of oil changes while the oil is accumulated in the oil reservoir within a prescribed amount; and an oil feeding passageway that allows communication between the oil reservoir and the crank chamber when a negative pressure is created in the crank chamber to suck up the oil in the oil reservoir from the intake part and supplies the oil to the crank chamber. The open end of the oil feeding passageway which is open in the crank chamber opens when the piston moves from a position near the top dead center to the top dead center. Therefore, even if the oil reservoir is tilted, it is possible to supply a sufficient amount of liquid oil to the crank chamber, and consequently prevent lubrication failure around the crankshaft. In addition, the flow rate control passageway is provided to allow communication between the oil feeding passageway and the supply passageway that supplies oil mist from the oil reservoir to the valve operating chamber. By this means, it is possible to prevent oil from being oversupplied to the crank chamber even if the oil reservoir is tilted. This prevents the oil mist produced in the crank chamber from being oversupplied to the valve operating chamber via the oil reservoir and the supply passageway.

In addition, the direct passageway is provided to allow communication between the valve operating chamber and the crank chamber when a negative pressure is created in the crank chamber. The open end part of the direct passageway which is open in the crank chamber is configured to open when the piston moves from a position near the top dead center to the top dead center, and close when the piston moves from a position near the top dead center to the bottom dead center. Therefore, one end of the direct passageway opens in the crank chamber when the piston moves from a position near the top dead center to the top dead center. As a result, it is possible to effectively apply the negative pressure in the crank chamber to the direct passageway. Meanwhile, when the piston moves from a position near the top dead center to the bottom dead center, it is possible to restrict oil from flowing from the crank chamber to the valve operating chamber. Therefore, it is possible to surely suck the oil remaining in the vale operating chamber and return the oil to the crank chamber, and consequently prevent oil from remaining in the valve operating chamber. Moreover, the flow rate control passageway prevents oil from being oversupplied to the crank chamber via the oil feeding passageway, and also prevent oil mist produced in the crank chamber from being oversupplied to the valve operating chamber. Therefore, it is possible to prevent oil from remaining in the valve operating chamber more reliably.

DESCRIPTION OF EMBODIMENTS

Figure 1:
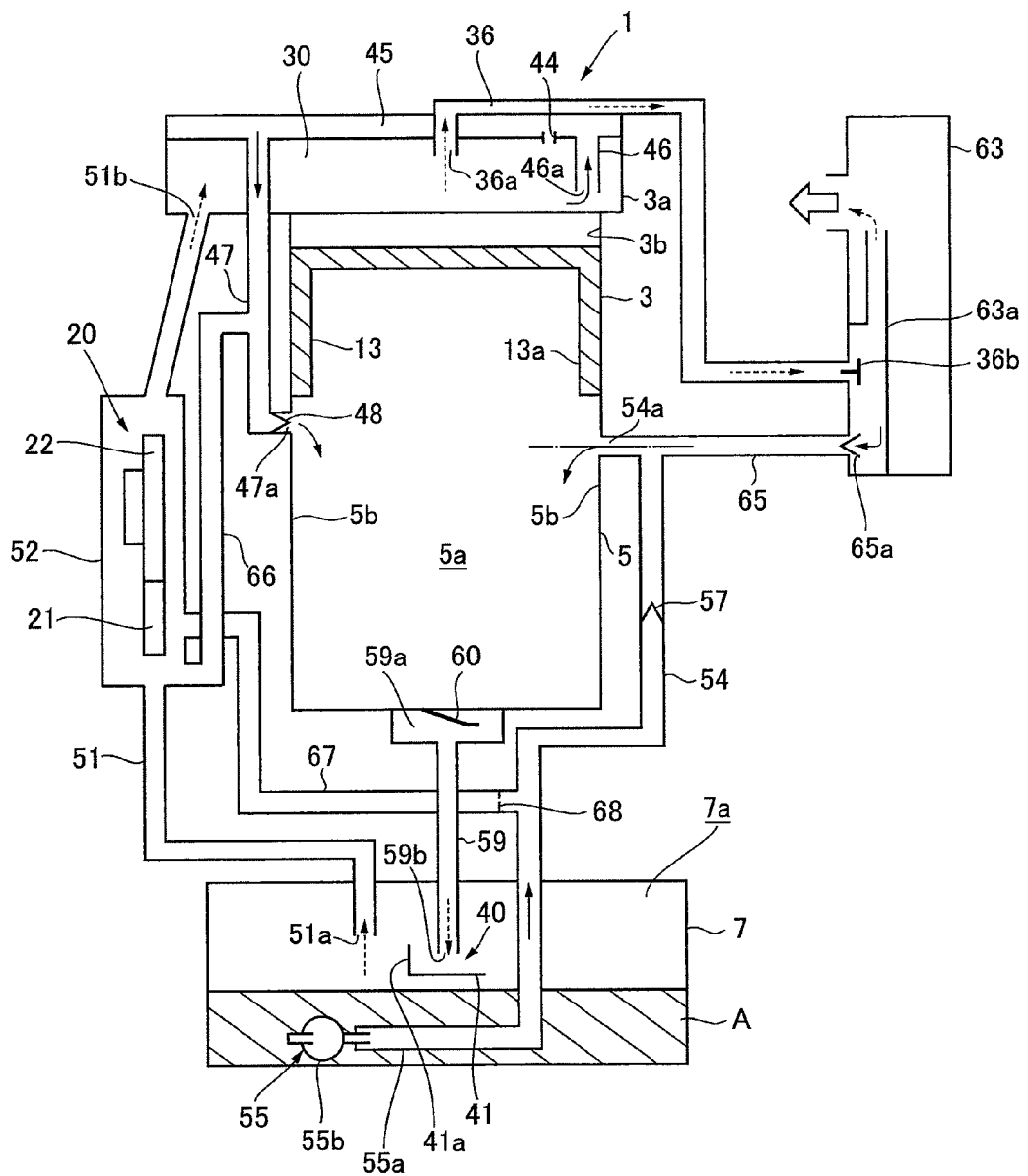
FIG. 1 is a schematic diagram showing a lubrication apparatus for a four-stroke engine according to one embodiment of the present invention, where a piston is located at the top dead center.
Figure 2:
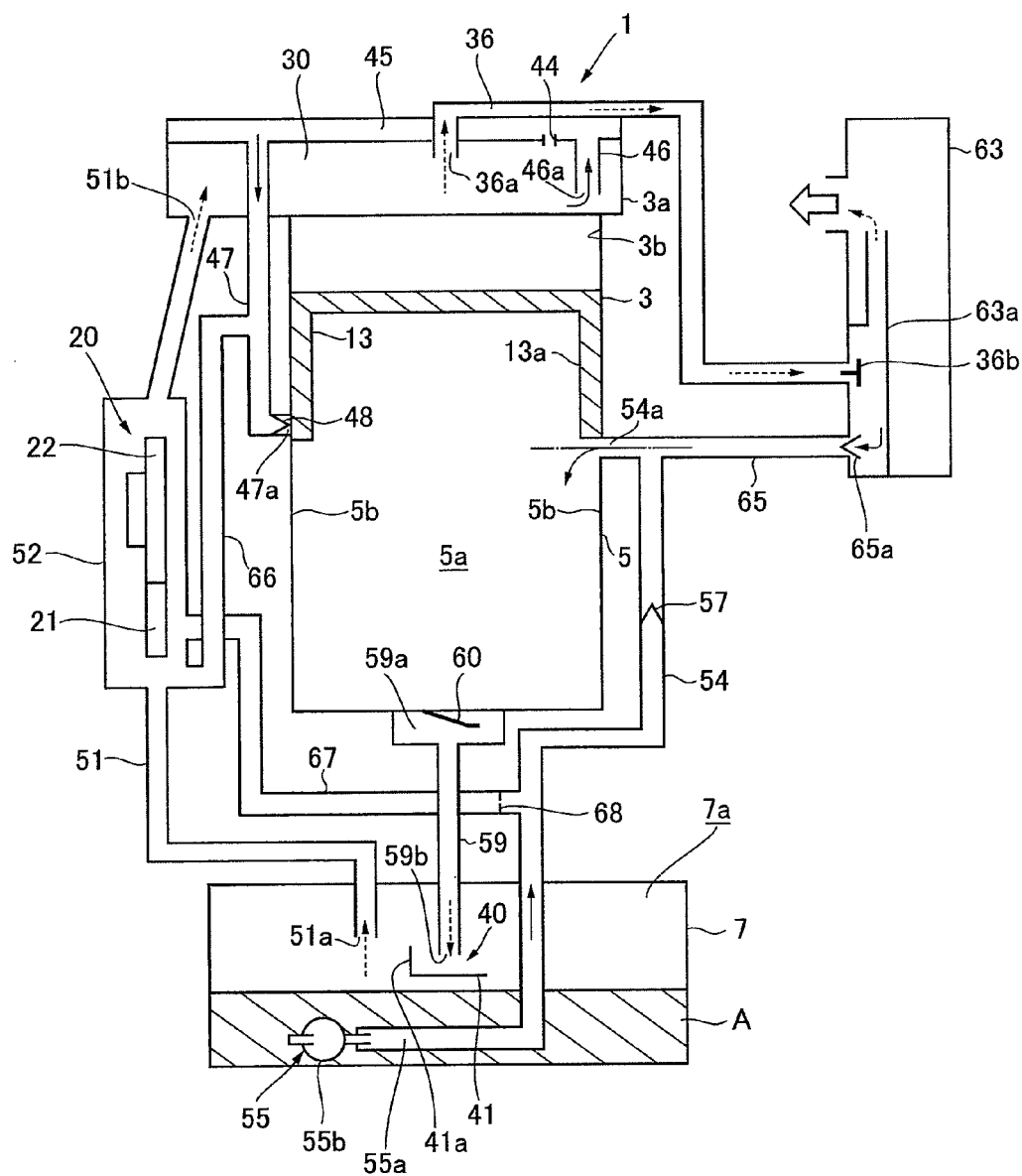
FIG. 2 is a schematic diagram showing the lubrication apparatus for a four-stroke engine according to the embodiment of the present invention, where an open end part of an oil feeding passageway in the crank chamber side is open and an open end part of a direct passageway in the crank chamber side is closed.

Now, preferred embodiments of the lubrication apparatus for a four-stroke engine according to the present invention will be described with reference to the drawings. First, Embodiment 1 of the present invention will be explained with reference to FIG. 1 and FIG. 2. FIG. 1 is a schematic diagram showing a lubrication apparatus for a four-stroke engine according to Embodiment 1 of the present invention, where a piston is located at the top dead center. FIG. 2 is a schematic diagram showing the lubrication apparatus for a four-stroke engine according to Embodiment 1 of the present invention, where an open end part of an oil feeding passageway in the crank chamber side is open and an open end part of a direct passageway in the crank chamber side is closed.

As shown in FIG. 1, a four-stroke engine (hereinafter referred to as "engine 1") includes a cylinder block 3 provided with a cylinder head 3a, crankcase 5 mounted on the lower part of a cylinder block 3 to form a crank chamber 5a, and an oil reservoir 7 provided below the crank case 5. The oil reservoir 7 is provided separately from the crankcase 5 and accumulates lubricating oil A (hereinafter referred to as "oil A").

A crankshaft (not shown) is rotatably supported in the connecting portion between the cylinder block 3 and the crank case 5. A piston 13 is connected to the crankshaft via a counterweight and a connecting rod and so forth coupled with the counterweight. The piston 13 is slidably inserted in the cylinder 3b provided in the cylinder block 3.

An intake port and an exhaust port are provided on the upper wall of the cylinder 3b provided in the cylinder block 3. The intake port and the exhaust port communicate with a carburetor (not shown) and an exhaust muffler (not shown), respectively, and have an intake valve and an exhaust valve to open and close the respective ports.

A valve operating mechanism 20 drives these valves and includes parts such as a valve driving gear 21 firmly fixed to the crankshaft, a cam gear 22 driven by the valve driving gear 21, to which a cam is connected, and a rocker arm (not shown). The valve driving gear 21 and the cam gear 22 of the valve operating mechanism 20 are accommodated in a valve driving chamber 52. This valve driving chamber 52 is provided on the way of a supply passageway 51 that allows communication between the valve operating chamber 30 formed in the head of the cylinder block 3 and the oil reservoir 7. Meanwhile, the other parts of the valve operating mechanism 20, such as the rocker arm and so forth, are provided in the valve operating chamber 30.

An oil feeding passageway 54 is provided between the oil reservoir 7 and the cylinder block 3. An intake part 55 is attached to the end of the oil feeding passageway 54 in the oil reservoir 7 side. The intake part 55 includes a tubular body 55a which is made of an elastic material such as rubber to be able to easily bend, and a weight 55b with a suction port, which is mounted on the tip of the tubular body 55a. The weight 55b of the intake part 55 is mounted to be able to move downward in a vertical direction by gravity. Therefore, even if the oil reservoir 7 is tilted, it is possible to place the suction port of the intake part 55 below the level of the oil A accumulated within a prescribed amount.

The oil feeding passageway 54 serves to allow communication between the crank chamber 5a and the oil reservoir 7 to suck up the oil A from the oil reservoir 7 and supplies the oil A into the crank chamber 5a when the pressure in the crank chamber 5a tends to be a negative pressure because the piston 13 moves upward. An open end part 54a of the oil feeding passageway 54 is open in the crank chamber 5a. This open end part 54a is located on a side wall 5b of the crank chamber 5a. This open end part 54a is positioned such that the open end part 54a opens as the piston 13 moves from a position near the top dead center to the top dead center. In other words, the open end part 54a is positioned to open when the skirt part 13a which is the lower part of the piston 13 passes over the open end part 54a. Therefore, the open end part 54a of the oil feeding passageway 54 has already been fully open at the time the piston 13 arrives at the top dead center. Details of the location of the open end part 54a of the oil feeding passageway 54 will be described later.

A one-way valve 57 is provided on the way of the oil feeding passageway 54. This one-way valve 57 is configured to open and close in response to pressure fluctuation in the crank chamber 5a. To be more specific, the one-way valve 57 opens when the pressure in the crank chamber 5a is lower than the pressure in the oil reservoir 7 to allow the oil feeding passageway 54 to communicate with the crank chamber 5a, and closes when the pressure in the crank chamber 5a is higher than in the oil reservoir 7. Here, this one-way valve 57 is not always needed. When the one-way valve 57 is not provided, it is important to adjust the position where the open end part 54a is open. Details of this will be described later.

A communicating passageway 59 is provided between the bottom of the crank chamber 5a and the oil reservoir 7 to allow communication between the crank chamber 5a and the oil reservoir 7. This communicating passageway 59 serves to supply oil mist produced in the crank chamber 5a and oil resulting from liquefying the oil mist to the oil reservoir 7. A reed valve 60 is provided in an open end part 59a of the communicating passageway 59, which is open in the crank chamber 5a side. This reed valve 60 is configured to be able to open and close in response to pressure fluctuation in the crank chamber 5a. To be more specific, the reed valve 60 opens when a positive pressure is created in the crank chamber 5a to allow the communicating passageway 59 to communicate with the crank chamber 5a. Therefore, when the reed valve 60 opens to allow the communicating passageway 59 to communicate with the crank chamber 5a, the oil mist and the oil in the crank chamber 5a are supplied to the oil reservoir 7 through the communicating passageway 59. Then, the oil mist and the oil are modestly supplied into the oil reservoir 7 without increasing the pressure in the crank chamber 5a more than necessary.

An open end part 59b of the communicating passageway 59 in the oil reservoir 7 side is open in approximately the center in the oil reservoir 7. This open end part 59 is positioned above the level of the oil A accumulated within a prescribed amount, regardless of how the oil reservoir 7 is tilted.

An open end part 51a of the supply passageway 51 is open in approximately the center in the inner space of the oil reservoir 7. This open end part 51a is arranged not to be positioned below the level of the oil A even if the oil reservoir 7 is tilted and the level of the oil A accumulated within a prescribed amount varies. Moreover, the open end part 59b extends more than the open end part 51a.

In this way, the arrangement is adopted where the open end part 59b of the communicating passageway 59 extends more than the open end part 51a of the supply passageway 51 into the oil reservoir 7. By this means, it is possible to prevent the oil mist discharged from the open end part 59b of the communicating passageway 59 from directly entering the open end part 51a of the supply passageway 51. More preferably, another exemplary configuration is possible where the communicating passageway 59 and the supply passageway 51 may be arranged such that the distance between the communicating passageway 59 and the supply passageway 51 increases in the direction of the open end parts.

A liquefying part 40 that liquefies the oil mist discharged from the open end part 59b is provided near the open end part 59b of the communicating passageway 59. The liquefying part 40 has a collision plate 41 to which the oil mist discharged from the open end part 59b adheres to liquefy the oil mist. A protrusion part 41a is provided in the end of the collision plate 41 in the supply passageway 51 side, which protrudes into the opposite direction to the direction in which the communicating passageway 59 extends. This protrusion part 41a shuts off between the open end part 59b and the open end part 51a.

By this means, the oil mist discharged from the open end part 59b of the communicating passageway 59 collides with the collision plate 41, and therefore is liquefied into oil. Then, the oil is discharged from the end of the collision plate 41 and returns to the oil accumulated in the oil reservoir 7. Remaining oil mist, which is discharged from the open end part 59b but not liquefied, is blocked by the protrusion part 41a, and therefore rarely enters the open end part 51a of the supply passageway 51.

Therefore, most of the oil mist discharged from the communicating passageway 59 is liquefied. As a result of this, it is possible to reduce the concentration of the oil mist accumulated in the oil reservoir 7, and therefore reduce the concentration of the oil mist supplied to the supply passageway 51.

The open end part 51b of the supply passageway 51 in the valve operating chamber 30 side is open in the valve operating chamber 30 in the cylinder block 3 side. Therefore, the oil mist flowing through the supply passageway 51 lubricates the valve operating mechanism 20 in the valve driving chamber 52, is discharged from the open end part 51b and then supplied into the valve operating chamber 30 to lubricate the rocker arm and so forth in the valve operating chamber 30.

A plurality of suction tubes 46 to suck the oil accumulated in the valve operating chamber 30 are provided in the valve operating chamber 30. Then, the suction tubes 46 are connected with a connecting passageway 45. The connecting passageway 45 is provided in the valve operating chamber 30 in the opposite side to the crank chamber 5a. The suction tubes 46 are provided in the valve operating chamber 30 to communicate with the connecting passageway 45 and extend to the crank chamber 5a side. The tip of each suction tube is open. The open tip of each suction tube 46 is arranged in the position near the bottom surface of the valve operating chamber 30 in the crank chamber 5a side to suck up the oil from the bottom surface of the valve operating chamber 30 in the crank chamber 5a side. Then, the suction tubes 46 are arranged in the corners of the valve operating chamber 30 in order to suck the oil accumulated in the valve operating chamber 30 through any of the suction tubes 46 even if the engine 1 is tilted while the valve operating chamber 30 is located in an upper position.

In addition, a plurality of small holes 44 are provided on the connecting passageway 45. These small holes 44 are arranged in the corners of the valve operating chamber 30 opposite to the crank chamber 5a side. It is possible to suck the oil accumulated in the valve operating chamber 30 through any of the small holes 44 even if the engine 1 is tilted to place the valve operating chamber 30 in a lower position.

A direct passageway 47 is provided in the connecting passageway 45 to allow communication between the valve operating chamber 30 and the crank chamber 5a when a negative pressure is created in the crank chamber 5a. An open end part 47a of the direct passageway 47 is open in the crank chamber 5a. This open end part 47a is provided on the side wall 5b of the crank chamber 5a. Like the open end part 54a of the oil feeding passageway 54, this open end part 47a is positioned such that the open end part 47a opens as the piston 13 moves from a position near the top dead center to the top dead center.

In other words, the open end part 47a is positioned to open when the skirt part 13a which is the lower part of the piston 13 passes over the open end part 47a. Therefore, the open end part 47a of the direct passageway 47 has been fully open at the time the piston 13 arrives at the top dead center.

In addition, the open end part 47a of the direct passageway 47 is arranged to open after the open end part 54a of the oil feeding passageway 54 in the crank chamber 5a side opens. Therefore, as shown in FIG. 2, the open end part 47a of the direct passageway 47 is closed when the open end part 54a of the oil feeding passageway 54 is fully open. As a result, the negative pressure in the crank chamber 5a does not affect the direct passageway 47 but affects the oil feeding passageway 54, so that a sufficient amount of oil may be first supplied to the crank chamber 5a. Then, when the open end part 47a opens, a sufficient amount of air may be supplied to the crank chamber 5a.

In addition, it is preferable to provide a one-way valve 48 in the direct passageway 47 in the open end part 47a side, which allows oil to flow from the valve operating chamber 30 to the crank chamber 5a side and restricts oil from flowing from the crank chamber 5a to the valve operating chamber 30 side. In this way, it is possible to reliably prevent oil or oil mist from flowing backward from the crank chamber 5a to the valve operating chamber 30, and therefore reliably prevent oil from accumulating in the valve operating chamber 30.

One end of a breather passageway 36 is open in approximately the central part of the valve operating chamber 30, and the other end of the breather passageway 36 is connected to an air cleaner 63. The breather passageway 36 is designed for discharging blowby gas to a combustion chamber. The oil mist and the blowby gas in the valve operating chamber 30 are delivered to the air cleaner 63 via the breather passageway 36 and separated into gas and liquid, that is, separated into blowby gas and oil by an oil separator 63a provided in the air cleaner 63. The one end of the breather passageway 36 is open in approximately the central part of the valve operating chamber 30, and therefore, even if much oil remains in the valve operating chamber 30, does not easily suck the oil. A one-way valve 36b is provided in the breather passageway 36 to prevent blowby gas and oil mist from flowing backward from the air cleaner 63 to the valve operating chamber 30 side.

The oil having been subjected to the gas-liquid separation is supplied to the crank chamber 5a through a reflux passageway 65 that allows communication between the air cleaner 63 and the crank chamber 5a. A one-way valve 65a is provided in the reflux passageway 65 to allow oil to flow only to the crank chamber 5a side. Meanwhile, the blowby gas having been subjected to the gas-liquid separation is supplied to the combustion chamber with intake air.

A return passageway 66 to return the oil in the valve driving chamber 52 to the crank chamber 5a is provided between the bottom of the valve driving chamber 52 in the oil reservoir 7 side and the direct passageway 47. The return passageway 66 and the direct passageway 47 are connected to one another between the one-way valve 48 and the valve operating chamber 30. When a negative pressure is created in the crank chamber 5a, the oil accumulated in the valve driving chamber 52 is sucked via the return passageway 66. Since this return passageway 66 is connected to the crank chamber 5a via the one-way valve 48, oil rarely flows backward from the crank chamber 5a to the valve driving chamber 52.

By this arrangement to allow communication between the return passageway 66 and the direct passageway 47, it is possible to prevent oil from being oversupplied from the supply passageway 51 to the valve operating chamber 30. A flow rate control passageway 67 is provided, which has a function to suck oil and oil mist in the valve driving chamber 52, like the return passageway 66.

This flow rate control passageway 67 is provided between the valve driving chamber 52 and the oil feeding passageway 54. The flow rate control passageway 67 sucks the air in the valve driving chamber 52, and therefore it is possible to control the amount of oil supplied to the crank chamber 5a via the oil feeding passageway 54. If the more the flow rate control passageway 67 sucks air, the more the flow rate of the oil supplied via the oil feeding passageway 54 decreases. It is preferable to provide the flow rate control passageway 67 in a position apart from the bottom of the valve driving chamber 52, so that it is difficult for the flow rate control passageway 67 to suck the oil remaining in the valve driving chamber 52. To be more specific, the distance between the connecting portion of the flow rate control passageway 67 to the valve driving chamber 52 and the valve operating chamber 30 side is shorter than the distance between the connecting portion of the return passageway 66 to the valve driving chamber 52 and the valve operating chamber 30. Therefore it is possible to prevent the flow rate control passageway 67 from sucking oil.

The distance between the connecting portion of the flow rate control passageway 67 to the oil feeding passageway 54 and the oil reservoir 7 is shorter than the distance between the one-way valve 57 provided in the oil feeding passageway 54 and the oil reservoir 7. Therefore, when the one-way valve 57 blocks oil supply, oil accumulates in the oil feeding passageway 54 up to the one-way valve 57 in the oil reservoir 7 side, and consequently the oil is accumulated in the connecting part between the flow rate control passageway 67 and the oil feeding passageway 54. Therefore, at the time the oil feeding passageway 54 sucks air from the flow rate control passageway 67, not only the air supplied from the valve driving chamber 52 but also the oil in the oil feeding passageway 54 are supplied to the crank chamber 5a.

With the present embodiment, a flow restrictor 68 is provided in the flow rate control passageway 67 to control the flow rate of air supplied from the valve driving chamber 52 to the oil feeding passageway 54. This flow restrictor 68 has a communicating passageway with a smaller cross-sectional area than the cross-sectional area of the flow rate control passageway 67.

As described above, the flow rate control passageway 67 serves to control the flow rate of oil supplied to the crank chamber 5a via the oil feeding passageway 54 by sucking the air in the valve driving chamber 52. The flow rate control passageway 67 according to the present embodiment has an enough cross-sectional area to supply a sufficient amount of air to the oil feeding passageway 54. Then, the flow rate control passageway 67 is provided with the flow restrictor 68 to restrict the cross-sectional area of the flow-rate control passageway 67, and therefore control the amount of air to be supplied to the oil feeding passageway 54.

By this means, it is possible to more adequately and easily control the amount of air supplied to the oil feeding passageway 54 without influence of the fabrication tolerance of the flow rate control passageway 67. Consequently, it is possible to supply an adequate flow rate of oil by equipping the flow rate control passageway 67 with the flow restrictor 68 without influence of the fabrication tolerance of the flow rate control passageway 67.

That is, even if the cross-sectional area of the flow rate control passageway 67 varies, it is possible to control the amount of air sucked from the valve driving chamber 52 only by equipping the flow rate control passageway 67 with the flow restrictor 68, and therefore control the flow rate of oil supplied to the crank chamber 5a via the oil feeding passageway 54. That is, it is possible to easily control the flow rate of oil only with the design of the flow restrictor 68 without regard to the fabrication tolerance of the flow rate control passageway 67.

Here, the flow restrictor 68 does not need to be provided separately from the flow rate control passageway 67, but may be formed integrally with the flow rate control passageway 67. For example, part of the flow rate control passageway 67 is formed along the sealing surfaces of the cylinder block 3 and the crank case 5 and connected to the oil feeding passageway 54 on a sealing surface, so that it is possible to easily form the flow restrictor 68.

That is, the circulating route of the lubrication apparatus includes the oil feeding passageway 54, the communicating passageway 59, the supply passageway 51, the suction tubes 46, the small holes 44, the connecting passageway 45, the direct passageway 47, the breather passageway 36, the reflux passageway 65, the return passageway 66 and the flow rate control passageway 67.

When the engine 1 is activated, the pressure in the crank chamber 5a changes due to the upward and downward motion of the piston 13. To be more specific, when the piston 13 moves upward, the pressure in the crank chamber 5a decreases and tends to be a negative pressure, and, on the other hand, when the piston 13 moves downward, the pressure in the crank chamber 5a increases and tends to be a positive pressure.

As the piston 13 moves to the vicinity of the top dead center because the pressure in the crank chamber 5a tends to be a negative pressure, the open end part 54a of the oil feeding passageway 54 starts opening to allow communication between the crank chamber 5a and the oil reservoir 7. As a result of this, the negative pressure in the crank chamber 5a affects the oil feeding passageway 54. Even if the engine 1 is tilted, the intake part 55 of the oil feeding passageway 54 is positioned below the level of the oil A in the oil reservoir 7, so that the oil A is sucked from the oil reservoir 7 and supplied into the crank chamber 5a. The open end part 47a of the direct passageway 47 is still closed at the time the open end part 54a fully opens (see FIG. 2), and therefore it is possible to allow the negative pressure in the crank chamber 5a to substantially affect the oil feeding passageway 54. As a result, it is possible to sufficiently supply the oil A pumped up under the level of the oil A into the crank chamber 5a.

The flow rate control passageway 67 is connected to the oil feeding passageway 54. This flow rate control passageway 67 sucks the air in the supply passageway 51 to control the flow rate of oil supplied to the crank chamber 5a via the oil feeding passageway 54. This prevents oil from being oversupplied to the crank chamber 5a.

The oil supplied into the crank chamber 5a lubricates driving parts such as the piston 13 and the crankshaft. At the same time, the oil is scattered from these driving parts and becomes oil mist. Part of the oil mist adheres to the wall surface of the crank chamber 5a to be liquefied again.

As shown in FIG. 1, when the piston 13 moves further from the vicinity of the top dead center to the top dead center side, the open end part 47a of the direct passageway 47 opens, so that it is possible to allow the negative pressure in the crank chamber 5a to affect the direct passageway 47. Then, it is possible to supply sufficient air to the crank chamber 5a via the direct passageway 47 to produce oil mist. In addition, even if much oil remains in the valve operating chamber 30, it is possible to return the oil to the crank chamber 5a.

When the piston 13 moves downward from the top dead center, the pressure in the crank chamber 5a changes to a positive pressure. When a positive pressure is created in the crank chamber 5a, the reed valve 60 is easily released to allow communication between the crank chamber 5a and the oil reservoir 7. Then, the oil mist and the oil in the crank chamber 5a are supplied to the oil reservoir 7 via the communicating passageway 59, so that the pressure in the oil reservoir 7 increases. The oil mist discharged from the communicating passageway 59 is liquefied by the liquefying part 40 to be transformed into oil, and then accumulated in the oil reservoir 7. The concentration of the oil mist remaining in the oil reservoir 7 is lower than the concentration of the oil in the crank chamber 5a. Here, when a positive pressure is created in the crank chamber 5a, the direct passageway 47 and the oil feeding passageway 54 are blocked by the one-way valves 48 and 57, respectively, so as not to prevent the oil from flowing backward from the crank chamber 5a to the valve operating chamber 30 and the oil reservoir 7. Then, the open end parts 47a and 54a are closed by the piston 13.

Here, the one-way valves 48 and 57 are not always needed. When these one-way valves 48 and 57 are not provided, an arrangement may be adopted where the open end parts 47a and 54a are located closer to the top dead center side to close the open end parts 47a and 54a before a positive pressure is created in the crank chamber 5a in order to block the direct passageway 47 and the oil feeding passageway 54. Otherwise, one of the one-way valves 48 and 57 may be provided.

An increase in the pressure in the oil reservoir 7 causes the pressure gradient between the oil reservoir 7 and the valve operating chamber 30, so that the oil mist accumulated in the oil reservoir 7 is supplied to the valve operating chamber 30 via the supply passageway 51. In the course of supplying oil mist from the oil reservoir 7 to the valve operating chamber 30, each part of the valve operating mechanism 20 in the valve driving mechanism 52 provided in the supply passageway 51 is lubricated. In this case, part of the oil mist is liquefied.

The oil resulting from the liquefaction in the valve driving chamber 52 may be supplied to the crank chamber 5a via the return passageway 66 and the direct passageway 47. Therefore, it is possible to prevent the oil from excessively remaining in the valve driving chamber 52 and also prevent the oil from flowing into the valve operating chamber 30. In addition, it is possible to prevent the oil from clogging the supply passageway 51.

The oil mist supplied to the valve operating chamber 30 lubricates the valve operating mechanism 20 provided in the valve operating chamber 30 and is supplied to the crank chamber 5a via the direct passageway 47. Otherwise, in a case of the oil mist supplied into the vale operating chamber 30 is liquefied and remains in the vale operating chamber 30, it is possible to supply oil into the crank chamber 5a due to the effect that the level of negative pressure in the crank chamber 5a is high. As a result of this, it is possible to prevent oil from remaining in the valve operating chamber 30.

Therefore, it is possible to prevent oil from being discharged when blowby gas is discharged from the valve operating chamber 30 via the breather passageway 36.

In this way, even if the oil reservoir 7 is tilted, the lubrication apparatus for the four-stroke engine 1 according to the present invention can supply, into the crank chamber 5a, a necessary and sufficient amount of the oil A sucked from the oil reservoir 7 via the oil feeding passageway 54. Therefore, it is possible to prevent lubrication failure from occurring around the crankshaft. Then, oil is not oversupplied to the crank chamber 5a, and therefore the oil mist produced in the crank chamber 5a is not oversupplied to the valve operating chamber 30. In addition, it is possible to efficiently circulate oil and oil mist thanks to the interaction between the open end parts 54a and 47a and the piston 13, and the effect of the reed valve 60. Moreover, it is possible to prevent oil from remaining in the valve operating chamber 30 by surely sucking the oil remaining in the valve operating chamber 30 and returning the oil to the crank chamber 5a.

Variation 1

Figure 3:
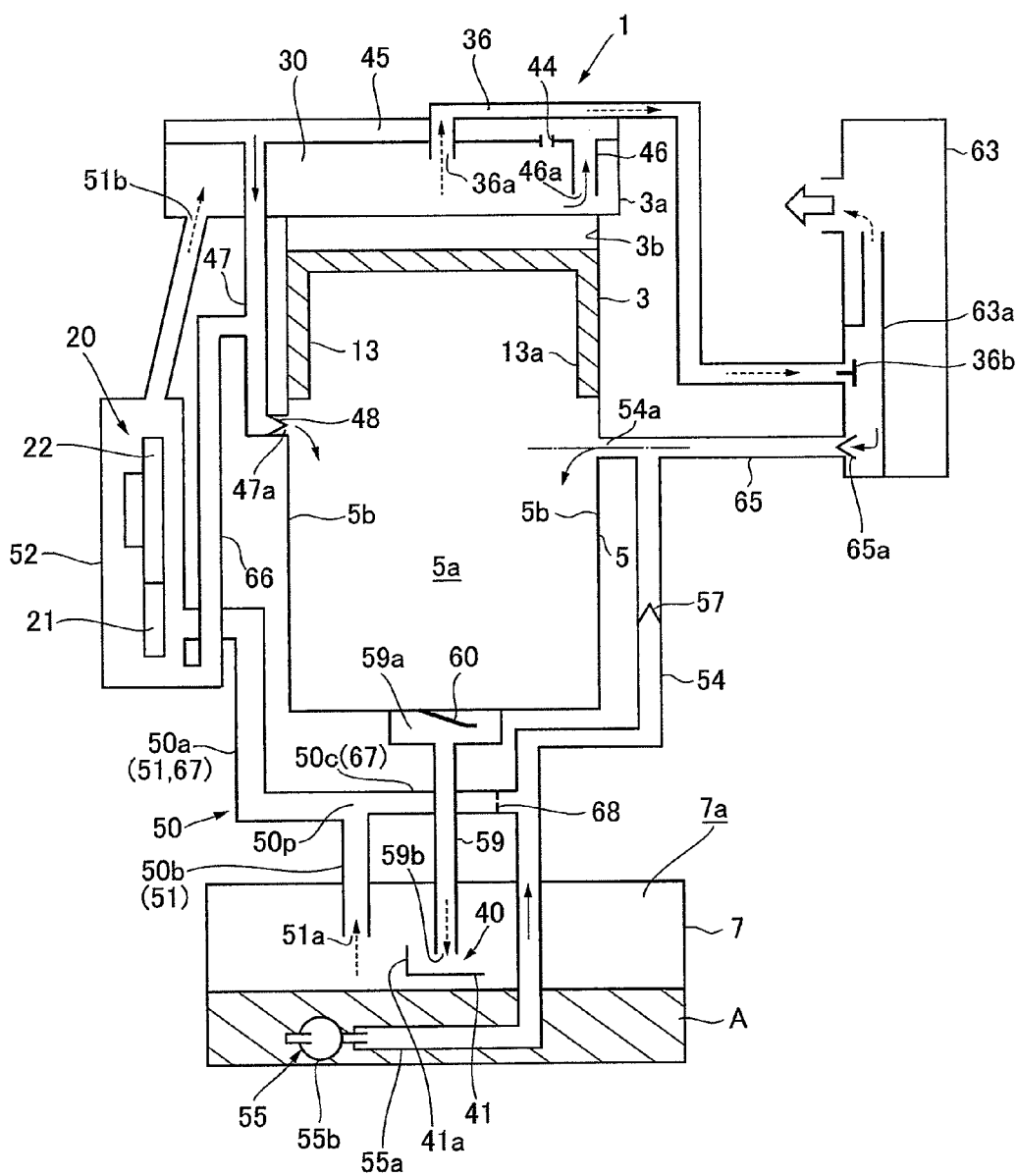
FIG. 3 is a schematic diagram showing the lubrication apparatus for a four-stroke engine according to variation 1 of the present invention, where the piston is located at the top dead center.
Figure 4A:
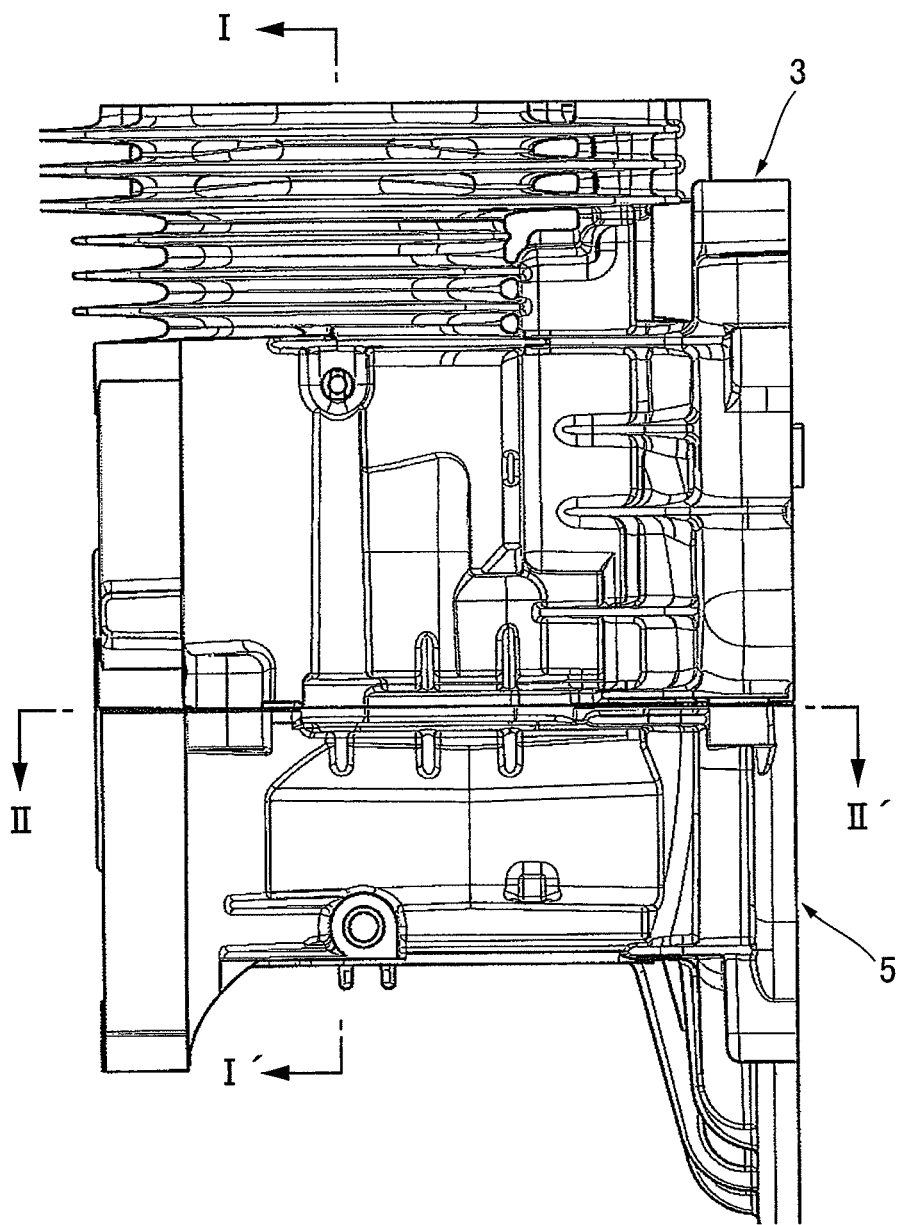
FIG. 4A is an external side view schematically showing the appearance of the configuration of a cylinder block and a crank case in the four-stroke engine according to the variation of the present invention.
Figure 4B:
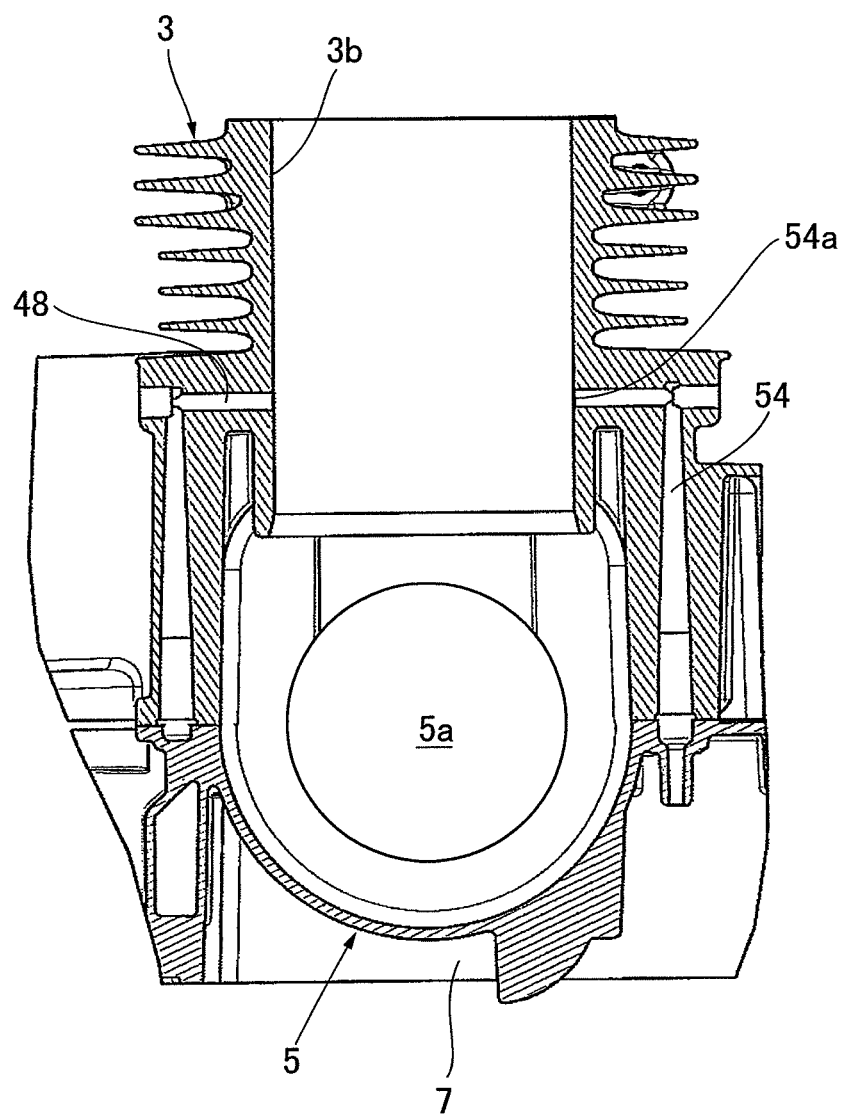
FIG. 4B is a schematic cross-sectional view taken along line I-I' in FIG. 4A.
Figure 4C:
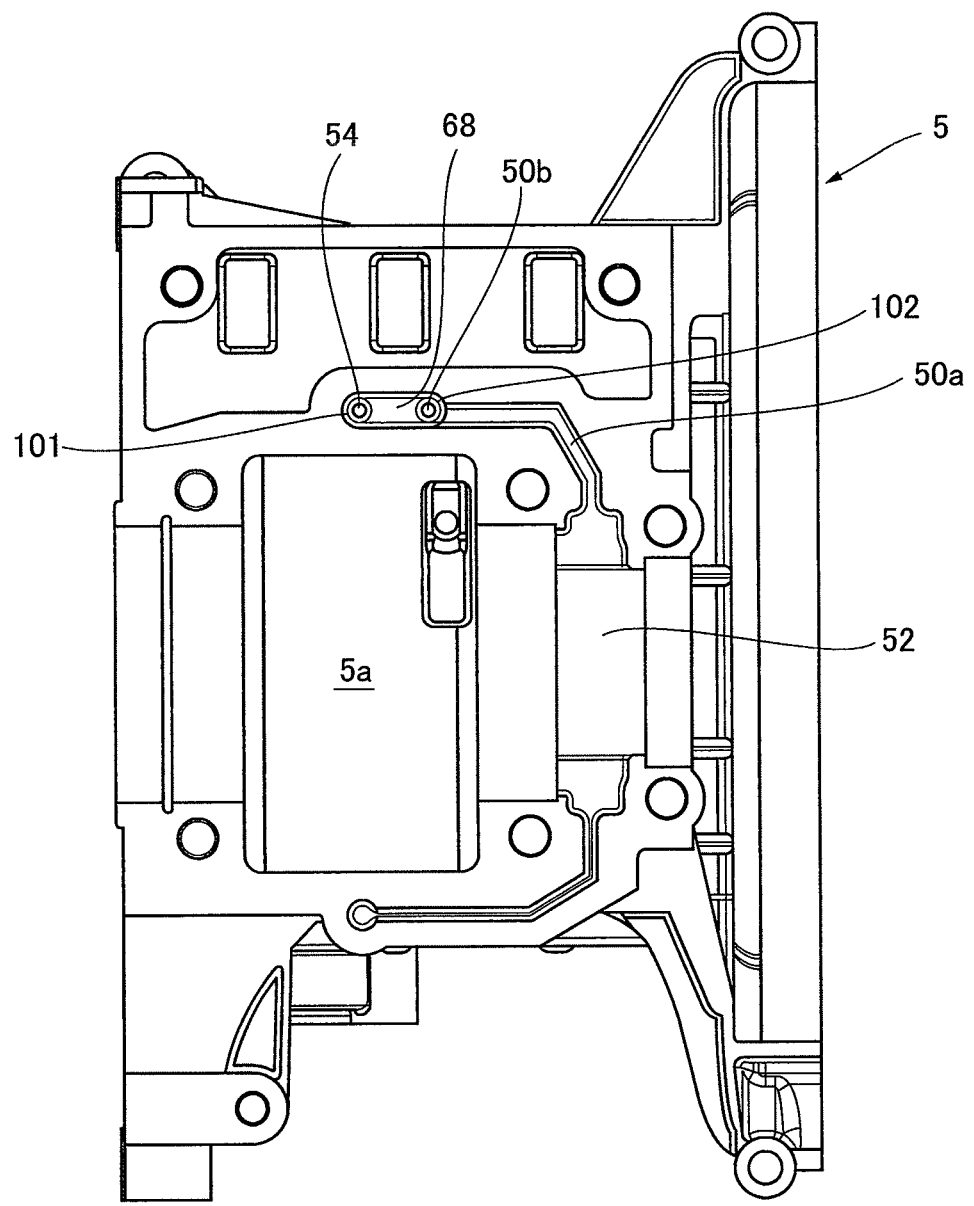
FIG. 4C is a schematic cross-sectional view taken along line II-II' in FIG. 4A.
Figure 5:
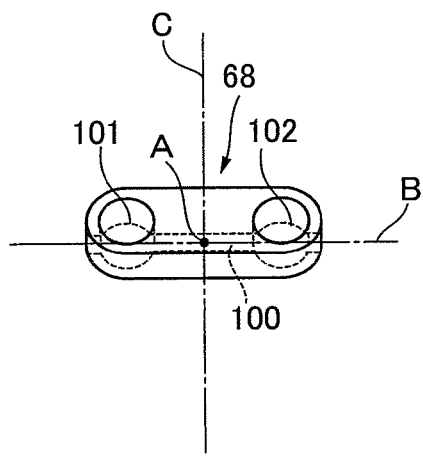
FIG. 5A is a schematic perspective view showing, from one direction, the configuration of a flow restrictor according to the variation of the present invention.
FIG. 5B is a schematic perspective view showing, from the other direction, the configuration of the flow restrictor according to the variation of the present invention.
Figure 5:
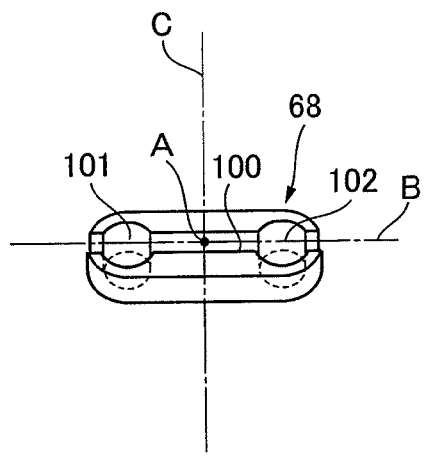

Next, variation 1 of the lubrication apparatus for a four-stroke engine according to the present invention will be described with reference to FIG. 3 to FIG. 5B. FIG. 3 is a schematic diagram showing the lubrication apparatus for a four-stroke engine according to variation 1 of the present invention, where the piston is located at the top dead center; FIG. 4A is an external side view schematically showing the appearance of the configuration of the cylinder block and the crank case in the four-stroke engine according to variation 1 of the present invention; FIG. 4B is a schematic cross-sectional view taken along line I-I' in FIG. 4A; FIG. 4C is a schematic cross-sectional view taken along line II-II' in FIG. 4A; FIG. 5A is a schematic perspective view showing, from one direction, the configuration of the flow restrictor according to variation of the present invention; and FIG. 5B is a schematic perspective view showing, from the other direction, the configuration of the flow restrictor according to variation 1 of the present invention.

The lubrication apparatus for a four-stroke engine according to the present variation is the same as the above-described lubrication apparatus for a four-stroke engine except that the supply passageway 51 configured to allow communication between the oil reservoir 7 and the valve operating chamber 52 partly serves as the flow rate control passageway 67, and according to this, the shape of the flow restrictor 68 provided in the flow rate control passageway 67 varies. Therefore, the same or equivalent components are assigned the same reference numerals and overlapping descriptions will be omitted.

With the present variation, the flow rate control passageway 67 branches on the way of a passageway 50 that allows communication between the oil reservoir 7 and the valve driving chamber 52 and is connected to the oil feeding passageway 54. A passageway (hereinafter referred to as "a combination passageway 50a") connected from a branch point 50p of the passageway 50 to the valve driving chamber 52 functions as the supply passageway 51 and also as the flow rate control passageway 67. A passageway 50b extending from the branch point 50p to the oil reservoir 7 side functions as part of the supply passageway 51. A passageway 50c extending from the branch point 50p to the oil feeding passageway 54 side functions as part of the flow rate control passageway 67. By this means, it is possible to simplify the structure of the lubrication apparatus.

Then, the flow restrictor 68 is removably provided in the flow rate control passageway 67 to control the flow rate of air supplied from the valve driving chamber 52 to the oil feeding passageway 54. In this case, the flow restrictor 68 is mounted in the flow rate control passageway 67 and sandwiched between the cylinder block 3 and the crank case 5. That is, when the flow restrictor 68 is provided in the flow rate control passageway 67, it is sandwiched between the cylinder block 3 and the crank case 5. Therefore, there is no need for a separate fixing means for fixing the flow restrictor 68.

The flow restrictor 68 according to the present variation includes a first communicating passageway 101 constituting the oil feeding passageway 54, a second communicating passageway 102 constituting the supply passageway 51 and an approximately linear third communicating passageway 100 that connects between the first communicating passageway 101 and the second communicating passageway 102 to form the flow rate control passageway 67. Here, the flow restrictor 68 can be used when the positions of the first communicating passageway 101 and the second communicating passageway 102 are exchanged between one another.

Then, the third communicating passageway 100 in the flow restrictor 68 has an approximately linear shape and functions as the passageway 50c. With the present variation, as shown in FIGS. 5A and 5B, the first communicating passageway 101 and the second communicating passageway 102 have approximately the same cylindrical shape. Then, the distance between the first communicating passageway 101 and a center A of the third communicating passageway 100 is an approximately the same as the distance between the second communicating passageway 102 and the center A of the third communicating passageway 100.

That is, the first communicating passageway 101 and the second communicating passageway 102 are symmetric with respect to an axis C which extends from the center A of an axis B of the third communicating passageway 100 and is vertical to the axis B. That is, with the flow restrictor 68 according to the present variation, the amount of air supplied to the oil feeding passageway 54 does not change when the positions of the first communicating passageway 101 and the second communicating passageway 102 are exchanged between a first mode and second mode. In the first mode, the first communicating passageway 101 constitutes the oil feeing passageway 54 and the second communicating passageway 102 constitutes the supply passageway 51. In the second mode, the first communicating passageway 101 constitutes the supply passageway 51 and the second communicating passageway 102 constitutes the oil feeding passageway 54.

In this way, the flow restrictor 68 according to the present variation can be used even if the positions of its communicating passageways are exchanged between one another.

As described above, according to the present invention, even if the cross-sectional area of the flow rate control passageway 67 varies due to the fabrication tolerances of the cylinder block 3 and the crank case 5, the amount of air sucked from the valve driving chamber 52 may be controlled only by equipping flow rate control passageway 67 with the flow restrictor 68, so that it is possible to control the flow rate of oil supplied to the crank chamber 5a via the oil feeing passageway 54. That is, it is possible to easily control the flow rate of oil only by the design of the flow restrictor 68 without regard to the cross-sectional area of the flow rate control passageway 67.

REFERENCE SIGNS LIST 1 four-stroke engine
5a crank chamber
5b side wall
7 oil reservoir
13 piston
30 valve operating chamber
47 direct passageway
47a, 54a open end part
48, 57 one-way valve
51, 50a, 50b supply passageway
54 oil feeding passageway
55 intake part
59 communicating passageway
60 reed valve
67, 59a, 50c flow rate control passageway
68 flow restrictor
A lubricating oil (oil)

The invention claimed is:

1. A lubrication apparatus for a four-stroke engine configured to circulate oil accumulated in an oil reservoir provided separately from a crank chamber while lubricating each part of a valve operating mechanism for intake and exhaust, by supplying the oil to the crank chamber and a valve operating chamber accommodating the valve operating mechanism, using pressure fluctuation in the crank chamber, the pressure fluctuation being caused by reciprocating motion of a piston, and discharge blowby gas contained in a circulation route through which the oil circulates, from the valve operating chamber to a combustion chamber, the lubrication apparatus comprising:

an intake part configured to be positioned below a level of the oil even when an oil reservoir is tilted so that the level of the oil changes, the oil being accumulated in the oil reservoir within a prescribed amount;

an oil feeding passageway configured to allow communication between the oil reservoir and the crank chamber when a negative pressure is created in the crank chamber to suck up the oil in the oil reservoir from the intake part and supply the oil to the crank chamber;

an open end part of the oil feeding passageway configured to be open in the crank chamber, the open end part opening while the piston moves from a position near a top dead center to the top dead center, and closing while the piston moves from the position near the top dead center to a bottom dead center;

a communicating passageway configured to allow communication between the crank chamber and the oil reservoir when a positive pressure is created in the crank chamber and supply oil mist produced in the crank chamber to the oil reservoir;

a supply passageway configured to supply the oil mist from the oil reservoir to the valve operating chamber;

a direct passageway configured to allow communication between the valve operating chamber and the crank chamber when a negative pressure is created in the crank chamber;

an open end part of the direct passageway configured to be open in the crank chamber, the open end part opening when the piston moves from the position near the top dead center to the top dead center, and closing when the piston moves from the position near the top dead center to the bottom dead center; and a flow rate control passageway configured to allow communication between the oil feeding passageway and the oil supply passageway, wherein the oil feeding passageway sucks air in the supply passageway via the flow rate control passageway, so that a flow rate of the oil which flows through the oil feeding passageway and is supplied to the crank chamber, is controlled.

2. The lubrication apparatus for a four-stroke engine according to claim 1, wherein the flow rate control passageway includes a flow restrictor configured to be able to control a flow rate of air supplied to the oil feeding passageway.

3. The lubrication apparatus for a four-stroke engine according to claim 2, wherein the open end part of the oil feeding passageway which is open in the crank chamber side is provided in a position to open before the open end part of the direct passageway in the crank chamber side opens.

4. The lubrication apparatus for a four-stroke engine according to claim 3, wherein:

the oil feeding passageway includes a first one-way valve configured to allow the oil to flow from the oil reservoir to the crank chamber side and restrict the oil from flowing from the crank chamber to the oil reservoir side; and the direct passageway includes a second one-way valve configured to allow the oil to flow from the valve operating chamber to the crank chamber side and restrict the oil from flowing from the crank chamber to the valve operating chamber side.

5. The lubrication apparatus for a four-stroke engine according to claim 1, wherein the open end part of the oil feeding passageway which is open in the crank chamber side is provided in a position to open before the open end part of the direct passageway in the crank chamber side opens.

6. The lubrication apparatus for a four-stroke engine according to claim 5, wherein:

the oil feeding passageway includes a first one-way valve configured to allow the oil to flow from the oil reservoir to the crank chamber side and restrict the oil from flowing from the crank chamber to the oil reservoir side; and the direct passageway includes a second one-way valve configured to allow the oil to flow from the valve operating chamber to the crank chamber side and restrict the oil from flowing from the crank chamber to the valve operating chamber side.

7. The lubrication apparatus for a four-stroke engine according to claim 1, wherein:

the open end part of the oil feeding passageway and the open end part of the direct passageway are provided on a side wall of the crank chamber in which the piston reciprocates; the open end part and the open end part open when the piston moves from the position near the top dead center to the top dead center, and closes when the piston moves from the position near the top dead center to the bottom dead center; and the communicating passageway includes a reed valve.

8. The lubrication apparatus for a four-stroke engine according to claim 1, wherein part of the flow rate control passageway is provided between a cylinder block slidably supporting the piston and a crank case constituting the crank chamber.

9. A lubrication apparatus for a four-stroke engine configured to circulate oil accumulated in an oil reservoir provided separately from a crank chamber while lubricating each part of a valve operating mechanism for intake and exhaust, by supplying the oil to the crank chamber and a valve operating chamber accommodating the valve operating mechanism, using pressure fluctuation in the crank chamber, the pressure fluctuation being caused by reciprocating motion of a piston, the lubrication apparatus comprising:

an oil feeding passageway configured to allow communication between the oil reservoir and the crank chamber when a negative pressure is created in the crank chamber, and supply the oil in the oil reservoir to the crank chamber;

a communicating passageway configured to allow communication between the crank chamber and the oil reservoir when a positive pressure is created in the crank chamber, and supply oil mist produced in the crank chamber to the oil reservoir;

a supply passageway configured to supply the oil mist from the oil reservoir to the valve operating chamber; and a flow rate control passageway configured to allow communication between the oil feeding passageway and the supply passageway and control a flow rate of the oil which flows through the oil feeding passageway and is supplied to the crank chamber by making the oil feeding passageway suck air in the supply passageway.

10. The lubrication apparatus for a four-stroke engine according to claim 9, wherein the flow rate control passageway includes a flow restrictor configured to be able to control a flow rate of air supplied to the oil feeding passageway.

11. The lubrication apparatus for a four-stroke engine according to claim 10, wherein the flow restrictor is mounted in the flow rate control passageway while being sandwiched between the cylinder block slidably supporting the piston and the crank case constituting the crank chamber.

12. The lubrication apparatus for a four-stroke engine according to claim 10, wherein the flow restrictor is removably provided in the flow rate control passageway.

13. The lubrication apparatus for a four-stroke engine according to claim 12, wherein the flow restrictor is mounted in the flow rate control passageway while being sandwiched between the cylinder block slidably supporting the piston and the crank case constituting the crank chamber.

14. The lubrication apparatus for a four-stroke engine according to claim 12, wherein the flow restrictor includes:

a first communicating passageway constituting the oil feeding passageway;

a second communicating passageway constituting the supply passageway; and an approximately linear third communicating passageway configured to connect between the first communicating passageway and the second communicating passageway to form the flow rate control passageway, wherein the flow restrictor can be used when positions of the first communicating passageway and the second communicating passageway are exchanged between one another.

15. The lubrication apparatus for a four-stroke engine according to claim 14, wherein the flow restrictor is mounted in the flow rate control passageway while being sandwiched between the cylinder block slidably supporting the piston and the crank case constituting the crank chamber.

16. The lubrication apparatus for a four-stroke engine according to claim 9, wherein part of the flow rate control passageway is provided between a cylinder block slidably supporting the piston and a crank case constituting the crank chamber.

* * * * *